INVENTOR.
ROBERT L. HOOD
BY
ATTORNEY 3,156,196
TRIPODS FOR INSTRUMENTS HAVING OFF
CENTER AXES OF MOVEMENT
Robert L. Hood, Byram, Conn., assignor to Barnes Engineering Company, Stamford, Conn., a corporation of Delaware
Filed June 26, 1963, Ser. No. 290,689
4 Claims. (Cl. 108—4)

This invention relates to an improved tripod for instruments which require movement about axes which are off-center.

Tripods are used for many purposes where a stable, light support is necessary. Ordinary types give excellent results where the instruments attached to them are moved about axes which are either not off-center or where the instruments are so light that no tipping problem arises. Unfortunately, there are a number of instruments which are both heavy and require movements about axes which are off-center with respect to the tripod. One of the most important types of instruments is an infrared thermograph which is used for taking infrared pictures in the form of a raster similar to that of the early, low definition television pictures. A typical infrared thermograph is described and claimed in the Astheimer and Wormser Patent No. 2,895,049, July 14, 1959. The invention is, of course, not limited to use with infrared thermographs, but as this is one of the most important types of instruments for which the present invention is suitable, the following description will relate to such a use, although the invention is not limited thereto.

The thermograph is best shown in FIG. 2 of the drawings, which will be described in more detail below, and it will be apparent that the necessary scanning mirror scans by oscillating about a vertical axis and nutating about a horizontal axis. The intersection of these two axes is at a point far removed from the center of the tripod mounting platform. Since the thermograph is quite a heavy instrument, it therefore presents the problem which is solved by the present invention in a very acute form. Obviously, the thermograph must be pointed at the object to be thermographed or a folding mirror therefor if the object is a human being on a hospital bed. In each case it is necessary to move the thermograph about a vertical azimuth axis and a horizontal elevation axis which intersect in the center of the scanning mirror. As has been stated above, this intersection is far off center with respect to the tripod.

In an ordinary tripod where the adjustment is about a centered axis or axes, a thermograph mounted thereon normally presents the severe problem of easy manipulation of a heavy weight about offset axes, but there is an even more serious difficulty. When the instrument is moved, either in azimuth or elevation, about axes which do not coincide with the corresponding axis of the scanning mirror, the path length from the mirror to the subject being thermographed changes. This throws the thermograph out of focus, and at best requires a careful refocusing and at worst may require a guess, because with many thermographs there is no visual means of determining focus, for the infrared radiations which are used, particularly in medical diagnosis, are of wavelengths so long as to be completely invisible.

The present invention solves the above problems in a simple and very rugged form, and also presents the advantage of a very much cheaper mechanical construction. This is a quite unusual result, because ordinarily improvements to instrument mounts which produce better results involve more elaborate and more expensive construction. In the present case the advantages are without adidtional cost, and actually with quite a substantial saving in construction.

Essentially the present invention utilizes two mounting platforms on the top of the tripod. The first is movable on a curved track, the radius of curvature of which coincides with the elevation axis of the instrument. On this mounting table there is an offset pivot which is directly underneath the point of intersection of the elevation and azimuth axes of the instrument, and therefore forms a part of the azimuth axis. Rotatable about this pivot there is a second mounting table to which the instrument itself is rigidly attached. It is an easy matter to locate the azimuth axis pivot sufficiently offset so that the center of gravity of the whole thermograph substantiatlly coincides with the tripod center. This avoids problems of weight distribution which are offset, and permits all of the advantages of aiming without changing path length with a maximum of stability, and therefore the possibility for a tripod of minimum base size, which is an advantage where the tripod has to be moved in close quarters.

The invention will be described in greater detail in connection with the drawings in which.

Figure 1:
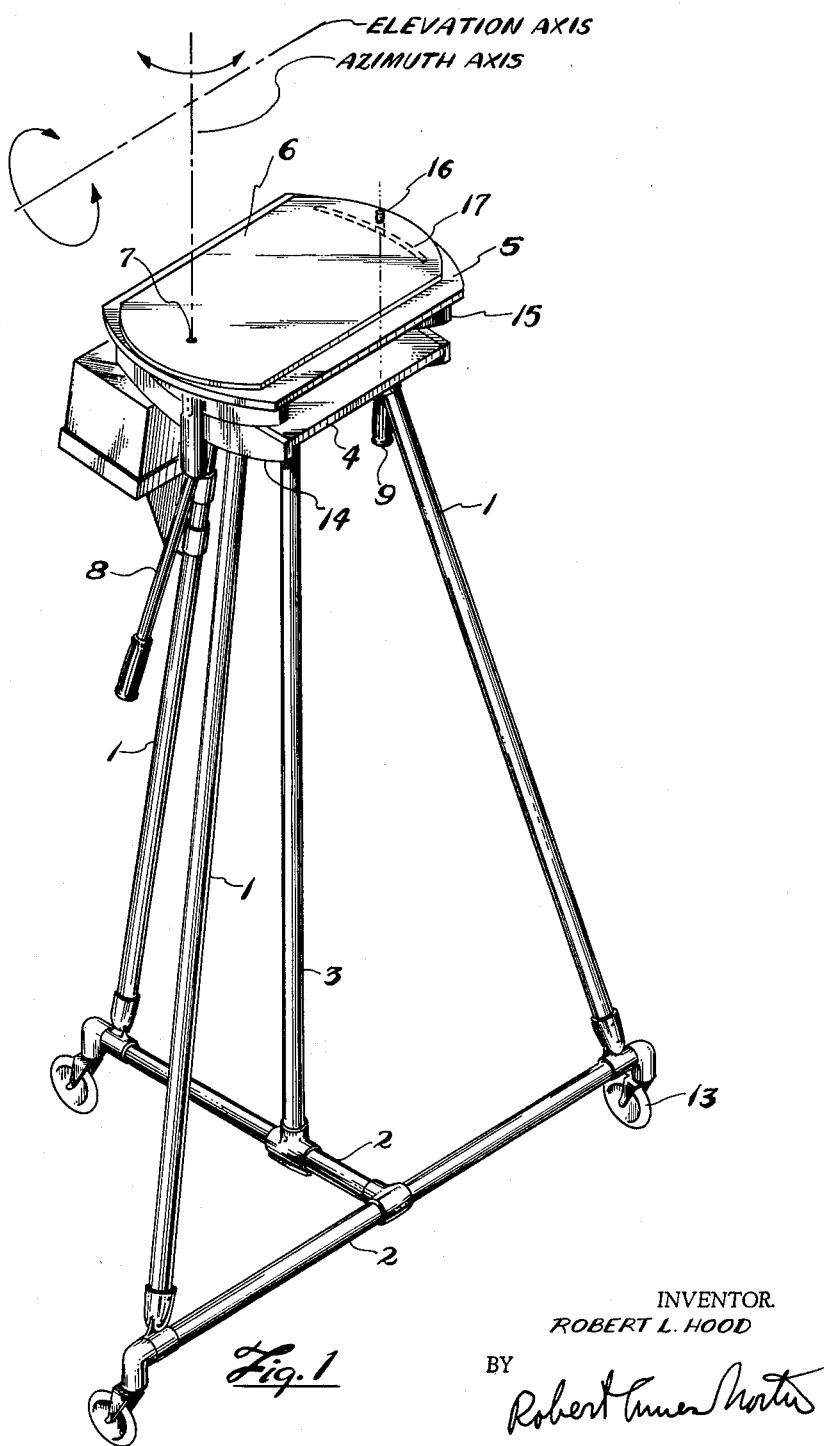
FIG. 1 is an isometric view of the tripod with thermograph removed.

The tripod proper is formed of three legs 1 fitting into two cross legs 2 from one of which a central leg 3 extends. The tripod is also provided with wheels 13 which are of the locking type. As the wheel lock is of standard design, it is not shown.

On the tripod legs there is mounted rigidly a head 4 at the ends of which there are tracks 14 with a curved surface of particular radius of curvature as will be described below. It will be apparent from FIG. 1 that the tripod is permanently formed of cheap pipe and pipe fittings. This greatly reduces the cost, and since it is practical to use tubing of light metal, such as aluminum, a tripod is produced of maximum stiffness and minimum cost and weight.

Figure 2:
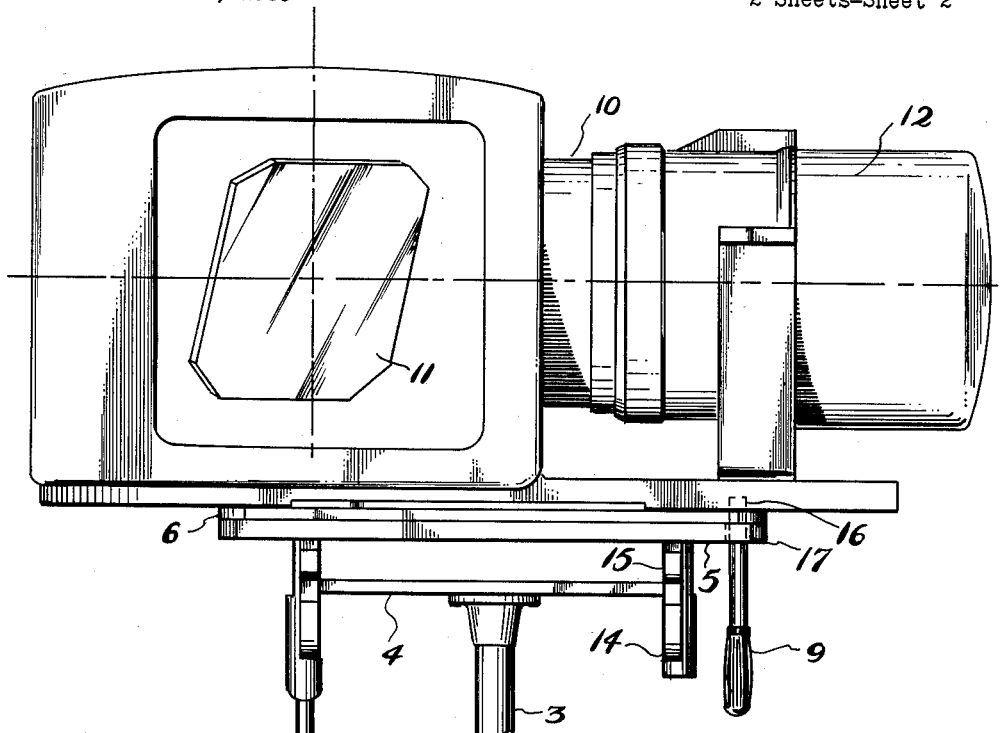
FIG. 2 is a side elevation of the upper part of the tripod with a thermograph in place.
Figure 3:
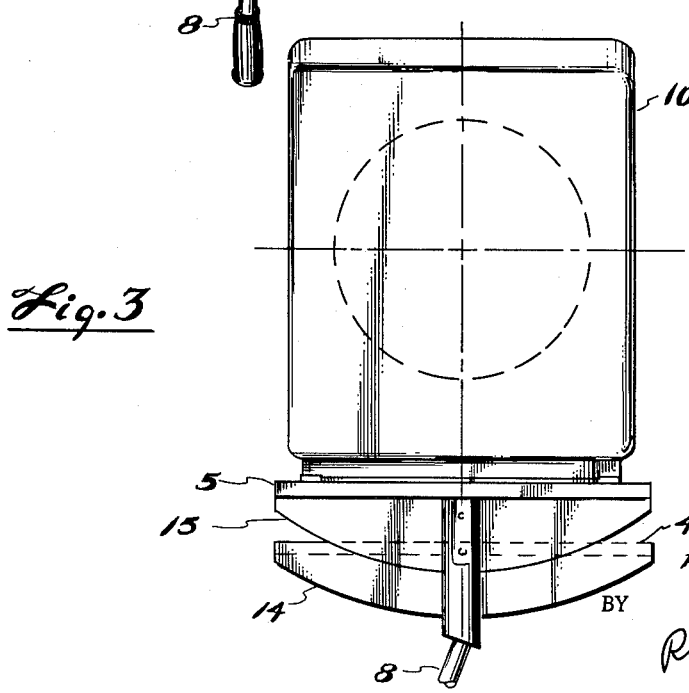
FIG. 3 is an end elevation of the upper part of the tripod and thermograph.

In FIG. 1, which shows the tripod framework itself, the thermograph is not shown mounted, but the two axes, namely, elevation and azimuth, are indicated and the rotation shown by the curved arrows. FIG. 2 shows the thermograph mounted, and it will be seen that the two axes meet in the center of the scanning mirror 11.

The curved tracks 14 at the ends of the tripod head 4 have a center of curvature coinciding with the elevation axis. A movable table 5 is mounted on curved rockers 15, which have the same radius of curvature as the tracks 14 and move thereon. Motion about the elevation axis is effected by the elevation handle 8 which is provided with a conventional lock actuated by the grip of the handle. As such locks are conventional in design and are not changed by the present invention, the locking means will not be described further in detail.

The table 5, which can be tilted on its rockers 15 about the elevation axis, is provided with a pivot 7 about which a second table 6 pivots. This pivot forms a part of the azimuth axis, as is shown in FIG. 1, and the table is moved by an azimuth handle 9 which can best be seen in FIG. 2. This handle is likewise provided with a twist grip lock as mentioned in connection with the elevation control handle 8. The handle 9 is threaded at its end, and screws into an opening 16 in the table 6. A curved slot 17 is present in table 5 as is shown in phantom in FIG. 1. This curved slot has a radius of curvature coinciding with the pivot 7. Table 6 can be temporarily removed by unscrewing the handle 9 and lifting it off the pivot 7. This permits easy attachment to the thermograph. After bolting to the thermograph, the table 6 is mounted on the pivot 7 and the handle 9 screwed into the threaded hole 16.

As described above, the thermograph is rigidly mounted on the table 6. The thermograph is shown generally at 10, with the camera housing 12 and the scanning mirror 11 to which reference has been made above. Since the present invention in no way changes the internal construction of the thermograph, the latter is shown only in elevation.

It will be seen that the thermograph can be aimed either in elevation by using the handle 8 or in azimuth by using handle 9, and at the same time the path length from the scanning mirror 11 to the subject being thermographed remains constant and sharp focus is thus retained. Likewise, aiming by rotation about the elevation axis does not move the center of gravity of the thermograph from the center of the tripod head 4. Aiming in azimuth does move the center of gravity slightly, but as the amount of motion is quite small, no problem of instability arises which is such a serious matter with an ordinary tripod construction where the axis about which movement is effected may be far from the center of gravity of the instrument.

The drawings have shown a permanent tripod frame construction of tubing. This is the preferred modification, as it produces a tripod having a maximum of strength and a minimum of weight. Of course, the invention is not broadly limited to such a tripod construction, and tripod legs of the usual type may be used, but as they are both more expensive and less rigid, and normally heavier, the light, permanent tubular construction constitutes the preferred form.

The essentials of the present invention require two tables on the tripod head, one of which moves in a track having a center of curvature corresponding to the elevation axis and the other about a pivot which forms part of the azimuth axis. The simplest form of elevation table movement is rockers, but, of course, other constructions, such as small wheels moving in a track of the correct center of curvature, or a pin in a curved slot may be used. It is desirable with heavy instruments to provide an azimuth table of substantial size, which may be substantially as big as for elevation. With lighter instruments a smaller table is suitable. In any event, the table should be sufficiently large so that a portion of it extends beyond the center axis of the tripod so that the center of gravity of a heavy instrument may be located above or near the central axis of the tripod. In the case of much lighter instruments, where the advantage of the constant optical path length of the instrument is the prime consideration, it is possible to mount an instrument so that the center of gravity is not exactly above the central axis of the framework, but it is just as simple to use the preferred form in which the final mounting table is so located.

I claim:

1. A tripod for instruments aimable about axes which do not coincide with the tripod head comprising
   (a) a tripod framework and mounting head, said mounting head being provided with curved tracks, the center of curvature of the tracks being above the tripod head,
   (b) a platform and means to tilt it on the tracks,
   (c) a pivot on said platform offset from the center of the tripod head, said pivot forming an axis at right angles to the platform,
   (d) a platform pivoting about said pivot and means for mounting an instrument on said last platform positioned so that the elevation axis of said instrument constitutes the axis of curvature of the tracks on the tripod head and the pivot forms a part of the azimuth axis of the instrument.

2. A tripod according to claim 1 for mounting an infrared thermograph, the second platform having a mounting means for the thermograph bringing the center of gravity thereof near to the center of the tripod head.

3. A tripod according to claim 1 in which the tripod framework is a permanent framework of tubes with cross pieces and a central tube extending from one cross piece to the center of the tripod head.

4. A tripod according to claim 2 provided with means for moving the two platforms about the elevation and azimuth axis of the thermograph, said means including handles with locking means.

References Cited in the file of this patent

UNITED STATES PATENTS

| | | |
|---|---|---|
| 1,211,895 | Theiss | Jan. 9, 1917 |
| 1,764,407 | Howell | June 17, 1930 |
| 1,840,556 | Arnold | Jan. 12, 1932 |
| 2,755,126 | Ludlow | July 17, 1956 |
| 2,794,612 | Clifton | June 4, 1957 |
| 2,796,226 | Dalton et al. | June 18, 1957 |
| 3,115,849 | Johnson | Dec. 31, 1963 |